(12) United States Patent
Jamison et al.

(10) Patent No.: US 11,408,280 B2
(45) Date of Patent: Aug. 9, 2022

(54) REAL-TIME MONITORING OF WELLBORE DRILL CUTTINGS

(71) Applicant: HALLIBURTON ENERGY SERVICES, INC., Houston, TX (US)

(72) Inventors: Dale E. Jamison, Humble, TX (US); Xiangnan Ye, Cypress, TX (US); Robert L. Williams, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 355 days.

(21) Appl. No.: 16/495,333

(22) PCT Filed: Dec. 17, 2018

(86) PCT No.: PCT/US2018/065976
§ 371 (c)(1),
(2) Date: Sep. 18, 2019

(87) PCT Pub. No.: WO2020/131006
PCT Pub. Date: Jun. 25, 2020

(65) Prior Publication Data
US 2021/0324734 A1    Oct. 21, 2021

(51) Int. Cl.
*E21B 47/12* (2012.01)
*G01N 27/02* (2006.01)
(52) U.S. Cl.
CPC ............. *E21B 47/12* (2013.01); *G01N 27/02* (2013.01)
(58) Field of Classification Search
CPC ........ E21B 47/12; E21B 47/125; E21B 49/00; G01N 27/02
See application file for complete search history.

(56) References Cited

U.S. PATENT DOCUMENTS

| | | |
|---|---|---|
| 4,412,130 A | 10/1983 | Winters |
| 2010/0071910 A1 | 3/2010 | Ellson et al. |

(Continued)

FOREIGN PATENT DOCUMENTS

| | | |
|---|---|---|
| WO | 9900575 A2 | 1/1999 |
| WO | 2018038717 A1 | 3/2018 |

OTHER PUBLICATIONS

PCT/US2018/065976, "International Search Report and Written Opinion", dated Aug. 27, 2019, 11 pages.

(Continued)

*Primary Examiner* — Caroline N Butcher
(74) *Attorney, Agent, or Firm* — Kilpatrick Townsend & Stockton LLP

(57) ABSTRACT

Certain aspects and features relate to a system and a sensor that provides real-time, downhole cutting concentration measurements. Electrical impedance measurements can be used in conjunction with a wired drill pipe to monitor the drill cuttings in the annulus under downhole conditions and along the drill string. This measurement provides direct information for optimal cuttings cleaning efficiency. In some examples, the system includes the sensor, a processing device connected to the sensor, and a non-transitory memory device including instructions that are executable by the processing device to cause the processing device to apply a transmitted signal to the sensor, receive an impedance signal from the sensor, and correlate the impedance signal with a wellbore cuttings concentration. In some examples the sensor includes multiple electrodes attachable to a drill string.

20 Claims, 12 Drawing Sheets

(56) References Cited

U.S. PATENT DOCUMENTS

2016/0024906 A1* 1/2016 Jamison .................. E21B 47/10
175/25
2017/0090060 A1 3/2017 Donderici et al.
2017/0131226 A1* 5/2017 Boul .................... G01N 33/383

OTHER PUBLICATIONS

Dynamic Drilling Solutions, InTerra Sensors and Systems, Tool Specification "5-in. Series BlackStream ASM Dynamics Tool", 2016 National Oilwell Varco (NOV-DDS-TS-1391-001), 1 page.
Johannessen, "Stick-Slip Prevention of Drill Strings Using Nonlinear Model Reduction and Nonlinear Model Predictive Control", Norwegian university of Science and Technology, Master of Science in Engineering Cybernetics dated May 2010, 111 pages.

* cited by examiner

REAL-TIME MONITORING OF WELLBORE DRILL CUTTINGS

TECHNICAL FIELD

The present disclosure relates generally to along-string measurement (ASM) in a well. More particularly, the present disclosure relates to a system that that can measure or monitor drill cuttings downhole in real time while a well is being drilled.

BACKGROUND

Removal of drill cuttings from downhole during drilling operations is important for avoiding problems such as stuck pipe and bit balling. In order to ensure enough drill cuttings are being removed in a short enough time to avoid such problems, the cuttings at the surface can be monitored throughout the drilling operation. Since it takes time for drill cuttings to move to the service, these surface monitoring methods do not provide real-time information regarding cutting concentrations downhole. Some approaches to provide such information rely on readings from Coriolis meters at the flow line as well as sensors at the shale shaker to provide data that can be used to calculate an estimate wellbore cleaning efficiency. A numerical model of the drilling operation can also be used to estimate cutting concentrations downhole. The accuracy of such estimates varies with the sophistication and accuracy of the calculations or the model.

BRIEF DESCRIPTION OF THE DRAWINGS

FIGS. 14A and 14B may be collectively referred to herein as FIG. 14.

FIGS. 15A and 15B may be collectively referred to herein as FIG. 15.

DETAILED DESCRIPTION

Certain aspects and features relate to a system and a sensor that provides real-time, downhole cutting concentration measurements. Electrical impedance measurements can be used in conjunction with a wired drill pipe to monitor the drill cuttings in the annulus under downhole conditions and along the drill string. This measurement provides direct information for optimal cuttings cleaning efficiency and enables a drill operator to minimize NPT (non-productive time). The system uses an electromechanical impedance spectroscopy (EIS) sensor signal and correlates the signal to the cutting concentration, thus providing a real-time measurement of cuttings downhole. Multiple sensors or sensors with multiple electrodes can be used to provide real-time mapping of cuttings in the downhole annulus.

In some examples, a system for monitoring drill cuttings downhole includes a sensor, a processing device communicatively coupled to the sensor, and a non-transitory memory device including instructions that are executable by the processing device to cause the processing device to perform operations. The operations include applying a transmitted signal to the sensor. In some examples the signal can have a frequency of from 1 kHz to 1 GHz. In some examples the signal can have a frequency of from 1 kHz to 1 MHz. The operations further include receiving an impedance signal from the sensor in response to the transmitted signal and correlating the impedance signal with a wellbore cuttings concentration at the sensor. The wellbore cuttings concentration can then be output for display or for any other purpose.

In some examples the sensor includes multiple electrodes attachable to a drill string to be in proximity to the wellbore cuttings. The sensor can be connectable to a processing device. In some examples, the system can detect a shorted electrode from among electrodes in the sensor and prevent or eliminate erroneous measurements that would otherwise be caused by the shorted electrode. In some examples, the electrodes of the sensor include a pair of parallel plates. In some examples the electrodes include multiple pairs of parallel plates. In some examples the electrodes include parallel rods spaced around the circumference of a drill pipe. In some example, the electrodes include circular electrodes attachable to an along-string-measurement (ASM) tool joint. In some examples, the electrodes include curved plates attachable to an ASM tool joint.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
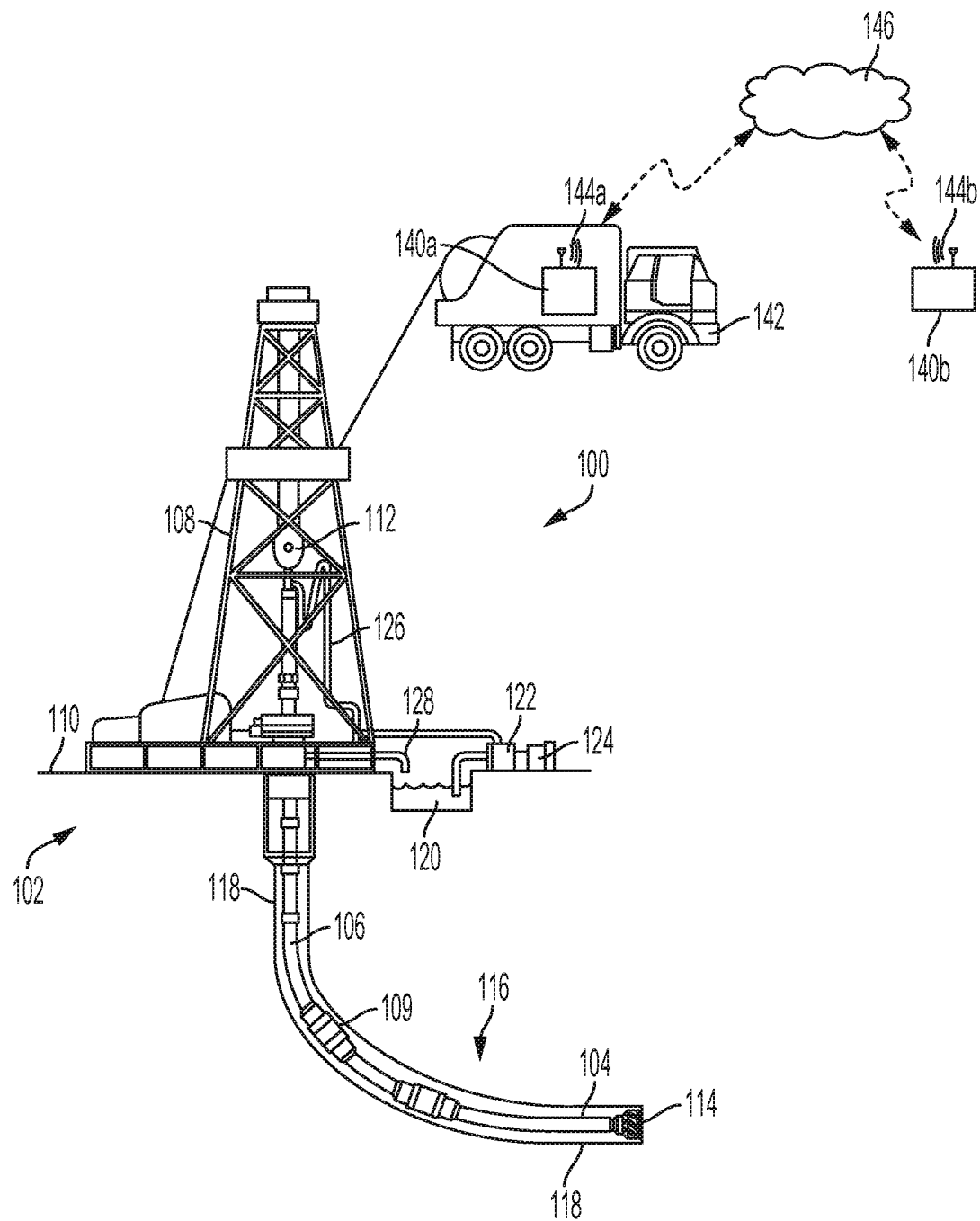
FIG. 1 is a cross-sectional view of an example of a drilling system that includes a system for real-time monitoring of drill cuttings according to some aspects of the disclosure.

FIG. 1 is a cross-sectional view of an example of a drilling system 100 that includes a system for real-time monitoring of drill cuttings according to some aspects of the disclosure. A wellbore of the type used to extract hydrocarbons from a formation may be created by drilling into the earth 102 using the drilling system 100. The drilling system 100 may be configured to drive a bottom hole assembly (BHA) 104 positioned or otherwise arranged at the bottom of a drillstring 106 extended into the earth 102 from a derrick 108 arranged at the surface 110. The derrick 108 includes a kelly 112 used to lower and raise the drillstring 106. The BHA 104 may include a drill bit 114 operatively coupled to a tool string 116, which may be moved axially within a drilled wellbore 118 as attached to the drillstring 106. Tool string 116 may include one or more tool joints 109, which further include sensors for use in ASM of drill cuttings to determine conditions in the wellbore. The sensors can send signals to the surface 110 via a wired or wireless connection (now shown). Some details of the tool string 116 and the sensors in this example are more easily visible in FIG. 2, discussed below. The combination of any support structure (in this example, derrick 108), any motors, electrical equipment, and support for the drillstring and tool string may be referred to herein as a drilling arrangement.

During operation, the drill bit 114 penetrates the earth 102 and thereby creates the wellbore 118. The BHA 104 provides control of the drill bit 114 as it advances into the earth 102. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drillstring 106 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the wellbore 118 and the drillstring 106, and in the process returns the drill cuttings and debris to the surface. The cuttings and mud mixture are passed through a flow line 128 and are processed such that a cleaned mud is returned down hole through the stand pipe 126 once again. Monitoring of the drill cuttings downhole as provided by sensors on tool joints 109 can provide information on conditions downhole and enable adjustment to the operation of mud pump 122 and other equipment in the drilling arrangement as appropriate.

Still referring to FIG. 1, the drilling arrangement and any sensors (through the drilling arrangement or directly) are connected to a computing device 140a. In FIG. 1, the computing device 140a is illustrated as being deployed in a work vehicle 142, however, a computing device to receive data from sensors and control drill bit 114 can be permanently installed with the drilling arrangement, be hand-held, or be remotely located. In some examples, the computing device 140a can process at least a portion of the data received and can transmit the processed or unprocessed data to another computing device 140b via a wired or wireless network 146. The other computing device 140b can be offsite, such as at a data-processing center. The other computing device 140b can receive the data, execute computer program instructions to determine cutting concentration downhole based on sensor signals, and communicate the concentration and other parameters to computing device 140a.

The computing devices 140a-b can be positioned belowground, aboveground, onsite, in a vehicle, offsite, etc. The computing devices 140a-b can include a processor interfaced with other hardware via a bus. A memory, which can include any suitable tangible (and non-transitory) computer-readable medium, such as RAM, ROM, EEPROM, or the like, can embody program components that configure operation of the computing devices 140a-b. In some aspects, the computing devices 140a-b can include input/output interface components (e.g., a display, printer, keyboard, touch-sensitive surface, and mouse) and additional storage.

The computing devices 140a-b can include communication devices 144a-b. The communication devices 144a-b can represent one or more of any components that facilitate a network connection. In the example shown in FIG. 1, the communication devices 144a-b are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 144a-b can use acoustic waves, surface waves, vibrations, optical waves, or induction (e.g., magnetic induction) for engaging in wireless communications. In other examples, the communication devices 144a-b can be wired and can include interfaces such as Ethernet, USB, IEEE 1394, or a fiber optic interface. The computing devices 140a-b can receive wired or wireless communications from one another and perform one or more tasks based on the communications.

Figure 2:
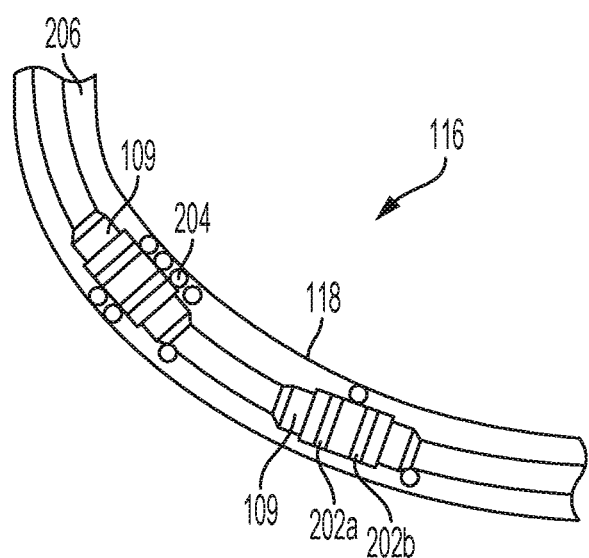
FIG. 2 is an expanded view of a portion of the downhole environment shown in FIG. 1 according to some aspects of the disclosure.

FIG. 2 is an expanded view of a portion of the downhole environment shown in FIG. 1 with tool string 116 enlarged for clarity. Measurements made along a drill pipe can include pressure, temperature and acceleration, with acceleration data provided by x,y,z accelerometers. EIS sensors 202 according to some aspects of the disclosure provide measurements of the presence of cuttings and their respective volume fraction as they are transported out of the wellbore. The data can then be used to tune cuttings transport models, provide early detection of wellbore cave-ins that can cause difficult transport, and provide an early warning of a stuck pipe due to cuttings build-up.

Each sensor 202 includes two circular electrodes that extend around the circumference of the tool joint. The sensors 202 include two electrodes 202a and 202b spaced a fixed distance from each other. In some aspects these are located on the same tool joint. The tool joint includes insulating material (not visible) in between the electrodes to maintain a stable spacing between the electrodes. Additional insulating material (not visible) is used to keep the electrodes electrically isolated from the tool joint material.

Still referring to FIG. 2, drill cuttings 204 are schematically shown within wellbore annulus 206. In this example, more drill cuttings 204 have accumulated around the tool joint that is further uphole than around the tool joint that is further downhole. This condition can be detected and monitored at the drilling arrangement. A higher cutting concentration will be reported by the computing device (not shown) at the surface for the uphole sensor than for the downhole sensor.

Figure 3:
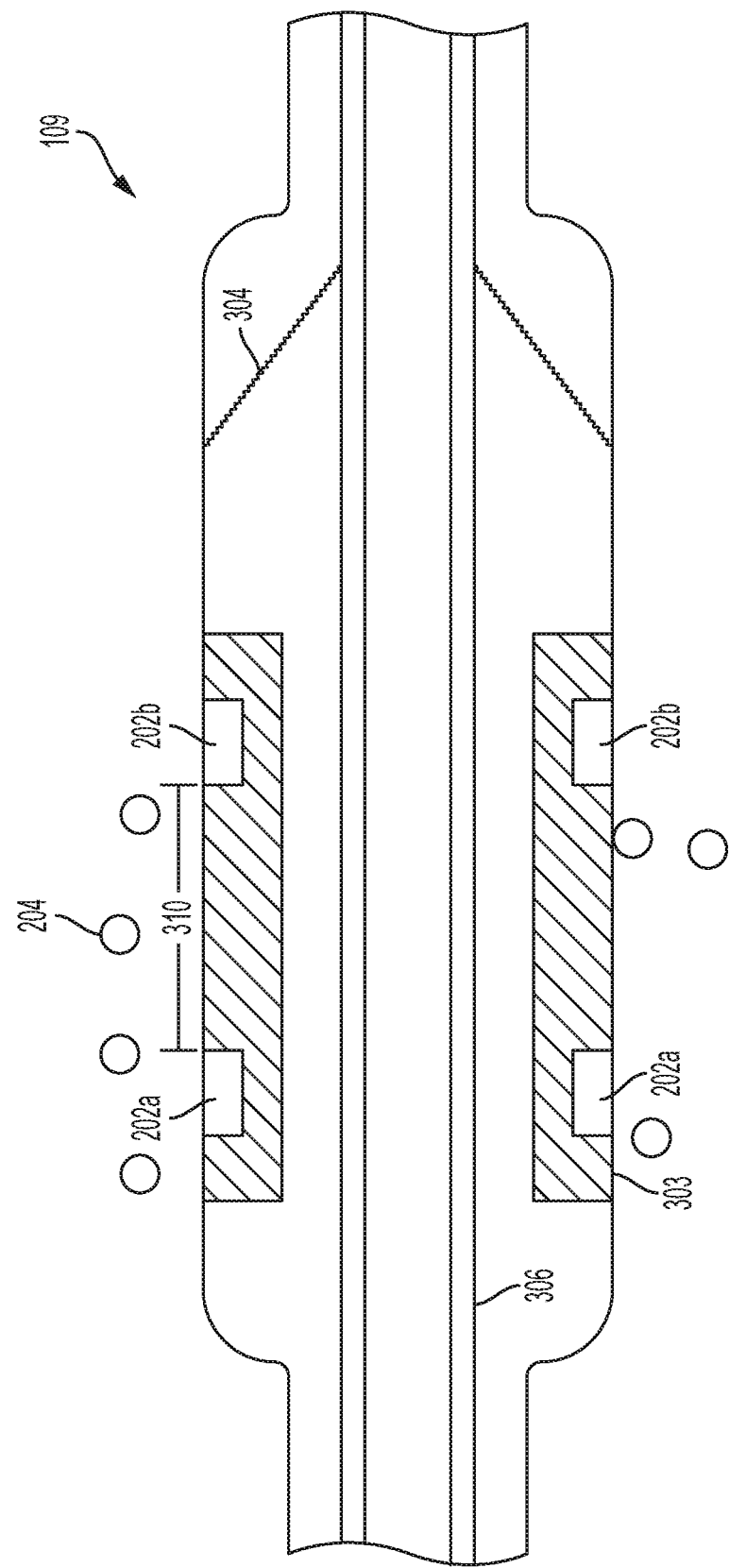
FIG. 3 is a cross-sectional view of a tool joint including a sensor according to some aspects of the disclosure.

FIG. 3 is a close-up, cross-sectional view of a tool joint 109 previously shown in FIG. 1 and FIG. 2. Insulating material 303 is visible supporting circular electrodes 202a and 202b. Internal threads 304 allow the tool joint to be separated as needed. Tool joint 109 includes and internal pipe 306. Insulating material 303 not only insulates the electrodes from each other and the tool joint, but also maintains a consistent separation distance 310 between the electrodes.

Figure 4:
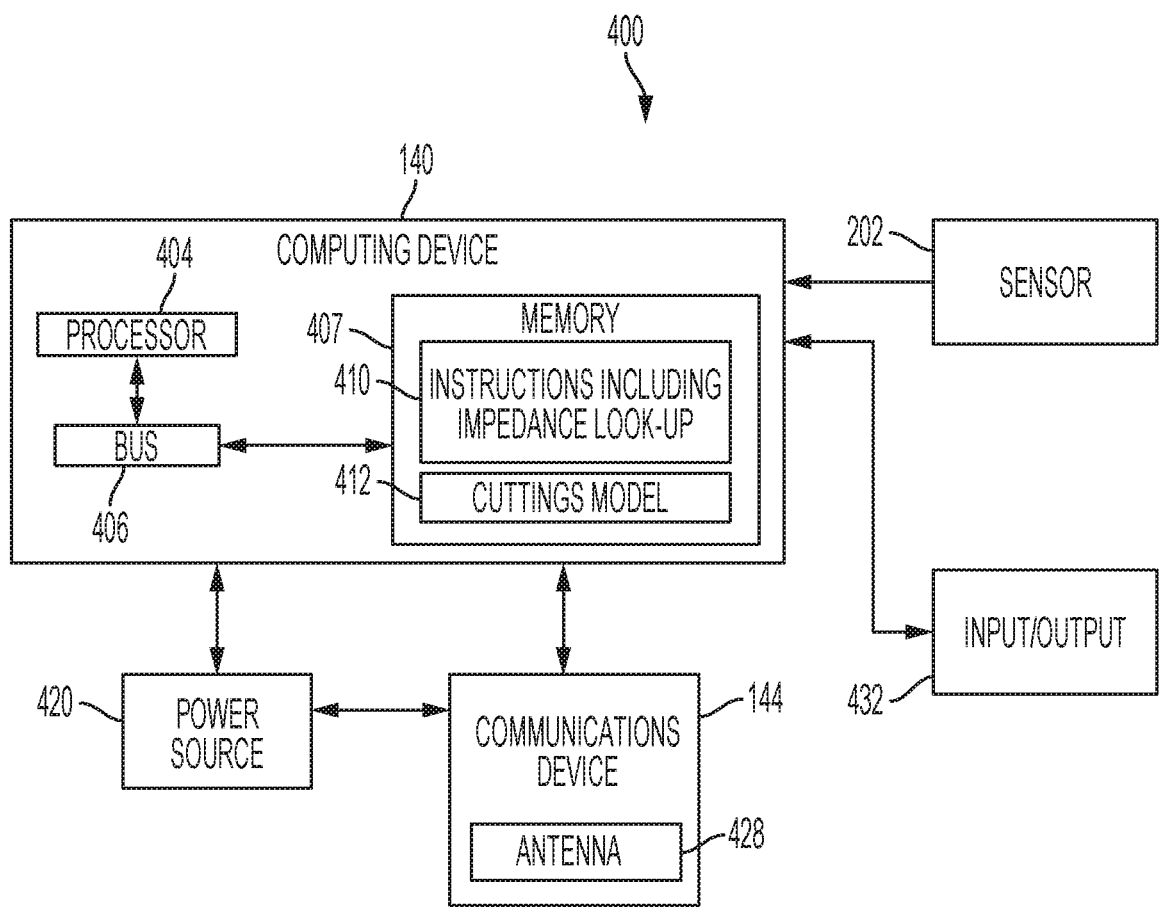
FIG. 4 is a block diagram of a computing system for real-time monitoring of drill cuttings according to some aspects of the disclosure.

FIG. 4 is a block diagram of a computing system 400 for real-time monitoring of drill cuttings according to some aspects of the disclosure. In some examples, the components shown in FIG. 4 (e.g., the computing device 140, power source 420, and communications device 144) can be integrated into a single structure. For example, the components can be within a single housing. In other examples, the components shown in FIG. 4 can be distributed (e.g., in separate housings) and in electrical communication with each other.

The system 400 includes a computing device 140. The computing device 140 can include a processor 404, a memory 407, and a bus 406. The processor 404 can execute one or more operations for obtaining cutting concentrations associated with sensors in the wellbore, and in some cases, comparing those concentrations to those predicted by a model. The processor 404 can execute instructions stored in the memory 407 to perform the operations. The processor 404 can include one processing device or multiple processing devices. Non-limiting examples of the processor 404 include a Field-Programmable Gate Array ("FPGA"), an application-specific integrated circuit ("ASIC"), a microprocessor, etc.

The processor 404 can be communicatively coupled to the memory 407 via the bus 406. The non-volatile memory 407 may include any type of memory device that retains stored information when powered off. Non-limiting examples of the memory 407 include electrically erasable and programmable read-only memory ("EEPROM"), flash memory, or any other type of non-volatile memory. In some examples, at least part of the memory 407 can include a medium from which the processor 404 can read instructions. A computer-readable medium can include electronic, optical, magnetic, or other storage devices capable of providing the processor 404 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

In some examples, the memory 407 can include computer program instructions 410 for looking up cutting concentrations that correlate with impedance signals received from a sensor 202. This look-up can, as an example, make use of a stored look-up table. These instructions 410 can also be usable for comparing cutting concentrations to those expected from a stored model 412 that projects cutting concentrations under various conditions. Computer program instructions 410 can also display cutting concentration values or forward those values to other systems using communication device 144, and handle control of any required signaling.

The system 400 can include a power source 420. The power source 420 can be in electrical communication with the computing device 140 and the communications device 144. In some examples, the power source 420 can include a battery or an electrical cable (e.g., a wireline). In some examples, the power source 420 can include an AC signal generator. The computing device 140 can operate the power source 420 to apply a transmission signal to the antenna 428 to forward cutting concentration data to other systems. For example, the computing device 140 can cause the power source 420 to apply a voltage with a frequency within a specific frequency range to the antenna 428. This can cause the antenna 428 to generate a wireless transmission. In other examples, the computing device 140, rather than the power source 420, can apply the transmission signal to the antenna 428 for generating the wireless transmission.

In some examples, part of the communications device 144 can be implemented in software. For example, the communications device 144 can include additional instructions stored in memory 407 for controlling the functions of communication device 144. The communications device 144 can receive signals from remote devices and transmit data to remote devices (e.g., the computing device 140b of FIG. 1). For example, the communications device 144 can transmit wireless communications that are modulated by data via the antenna 428. In some examples, the communications device 144 can receive signals (e.g., associated with data to be transmitted) from the processor 404 and amplify, filter, modulate, frequency shift, and otherwise manipulate the signals. In some examples, the communications device 144 can transmit the manipulated signals to the antenna 428. The antenna 428 can receive the manipulated signals and responsively generate wireless communications that carry the data.

The computing system 400 can receive input from EIS sensor(s) 202, shown in FIGS. 2 and 3. Computer system 400 in this example also includes input/output interface 432. Input/output interface 432 can connect to a keyboard, pointing device, display, and other computer input/output devices. An operator may provide input using the input/output interface 432. Cutting concentration values or other data related to the o operation of the system can also be displayed to an operator through a display that is connected to or is part of input/output interface 432.

Figure 5:
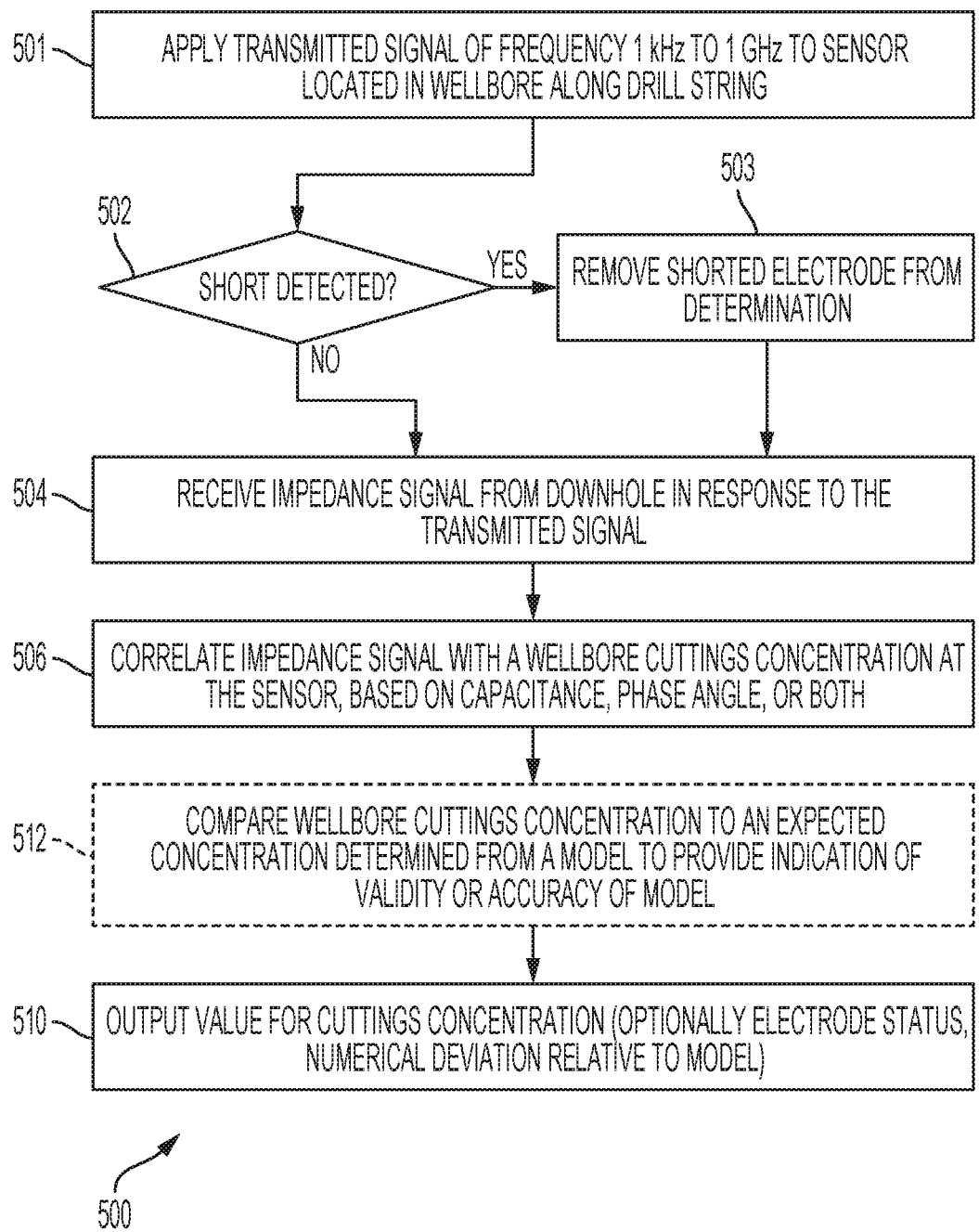
FIG. 5 is a flowchart of a process for real-time monitoring of drill cuttings according to some aspects of the disclosure.

FIG. 5 is an example of a flowchart of a process 500 for real-time monitoring of drill cuttings according to some aspects of the disclosure. At block 501, computing device 140 applies a transmitted signal of frequency 1 kHz to 1 MHz to an EIS sensor 202 located in the wellbore along the drill string. In some examples, a return signal is analyzed to determine if an electrode is shorted to the drill string, casing, formation, or another electrode at block 502. If so, the shorted electrode is removed from the determination of cutting concentration at block 503. This removal may involve eliminating one of the sensors from being used altogether, or if a sensor has more than two electrodes, relying only on a subset of the electrodes until the problem is corrected. At block 504, computing device 140 receive an impedance signal from downhole in response to the transmitted signal. At block 506, computing device 140, in some aspects using processor 404, correlates the impedance signal with a wellbore cuttings concentration at the sensor 202, based on capacitance, phase angle, or both. This correlation can be accomplished using a look-up table stored as part of computer program instructions 410. The table can derived in advance from calibration curves, examples of which are shown in FIGS. 7, 8, and 10-13, discussed below.

Still referring to FIG. 5, at block 508, computing device 140 can optionally compare wellbore cutting concentration to an expected cuttings concentration as determined from a stored cuttings model 412 to provide an indication of the validity or accuracy of the stored mode. At block 510, computing device 140 outputs a value for cuttings concentration at a sensor. The computing device can display the concentration at various sensors as a list, or with the status of electrodes or sensors, or with numerical deviation relative to the model. This information can optionally be displayed via a display device connected to input/output interface 432. This information can also be communicated to other systems or stored for future reference.

Figure 6:
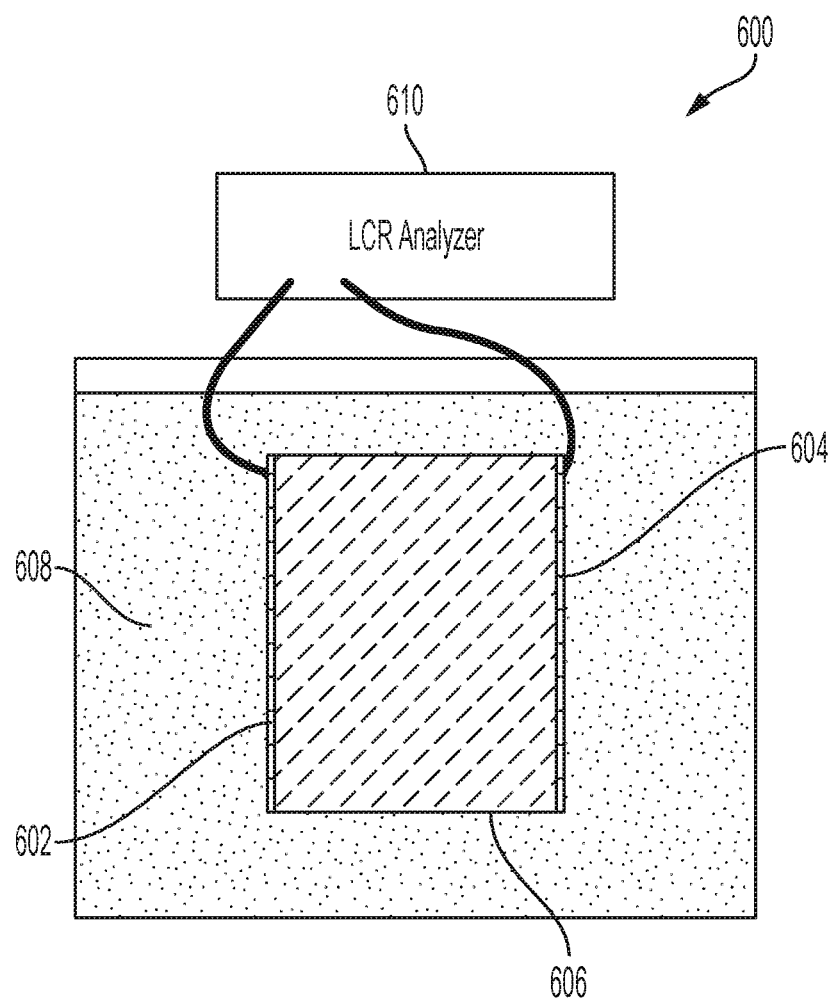
FIG. 6 is a cross-sectional view of a sensor that can be used in real-time monitoring of drill cuttings according to some aspects of the disclosure. The sensor in FIG. 6 is shown in a calibration setup according to some aspects of the disclosure.

FIG. 6 is a cross-sectional view of a sensor that can be used in real-time monitoring of drill cuttings according to some aspects of the disclosure. Sensor 600 includes, as electrodes, two parallel plates, 602 and 604, separated by insulating material 606. Such a sensor can be deployed in a drill string or tool string with only a dedicated insulator between the pair of electrodes. However, because the sensor can be calibrated for any positioning or arrangement, the electrodes can be deployed on the sides of a portion of the drill string such as a tool joint, with insulators to protect the electrodes from being shorted to the tool joint or other portion of a drill string or tool string. The sensor 600 in FIG. 6 is shown immersed in a drilling fluid 608 of oil-based mud at 12.7 ppg concentration and connected to an impedance (LCR) analyzer 610 for calibration. To obtain a calibration curve for sensor 600, impedance is measured over a wide range of frequencies for the drilling fluid 608 with various cutting concentrations. A frequency range of 1 kHz to 1 MHz is used. Both phase angle and capacitance have a strong correlation to the cutting concentration. In one example, a plastic tube with a diameter of one inch is used as an insulator to simulate a drilling pipe surrounded by drilling fluid with cuttings.

Figure 7:
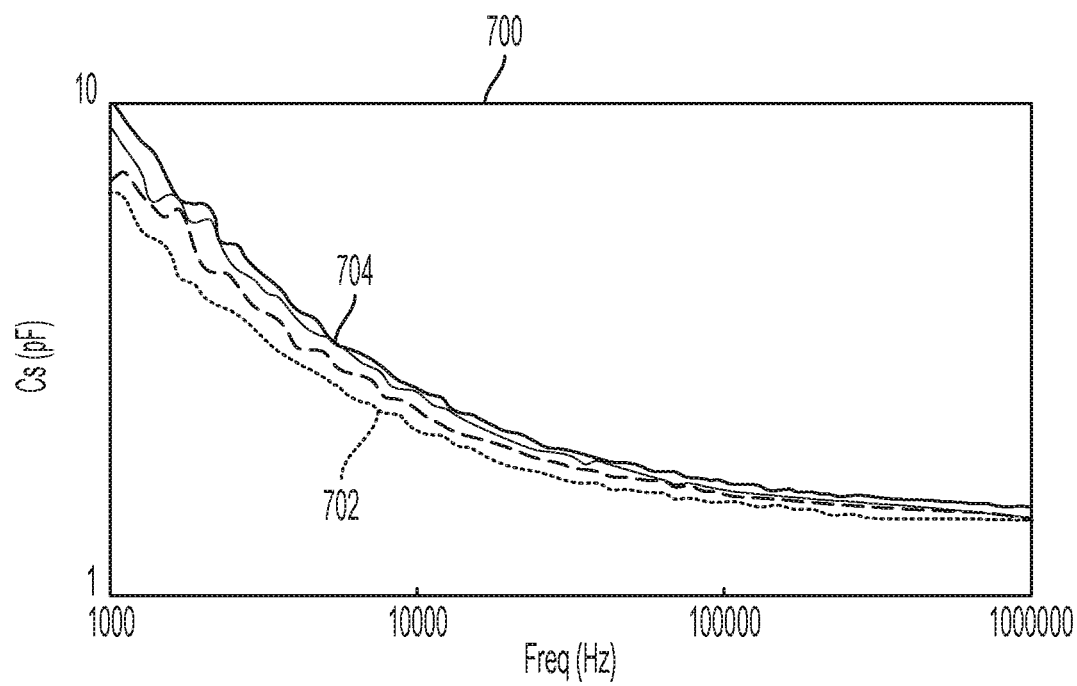
FIG. 7 and FIG. 8 are graphs of calibration curves for the sensor in FIG. 6 according to some aspects of the disclosure.

FIG. 7 is a graph of a calibration curve for the sensor in FIG. 6 according to some aspects of the disclosure. Graph 700 of FIG. 7 shows capacitance as a function of frequency using the sensor 600 described above for the OBM with various cutting loadings. The capacitance profile shifts upward with increasing cutting concentration. The lowest line 702 on the graph is the capacitance with no cuttings and the highest line 704 on the graph is the capacitance with a volume percentage of 7.14 percent by volume of cuttings. The other lines represent intermediate percent-by-volume cutting concentrations of 2.55 and 5.01 percent by volume moving from the lowest capacitance towards the highest. The sensor can detect a small change of cutting concentration in the drilling fluid. A correlation between the capacitance and cutting concentration (in volume fraction) can be obtained at any fixed frequency in the calibrated range.

Figure 8:
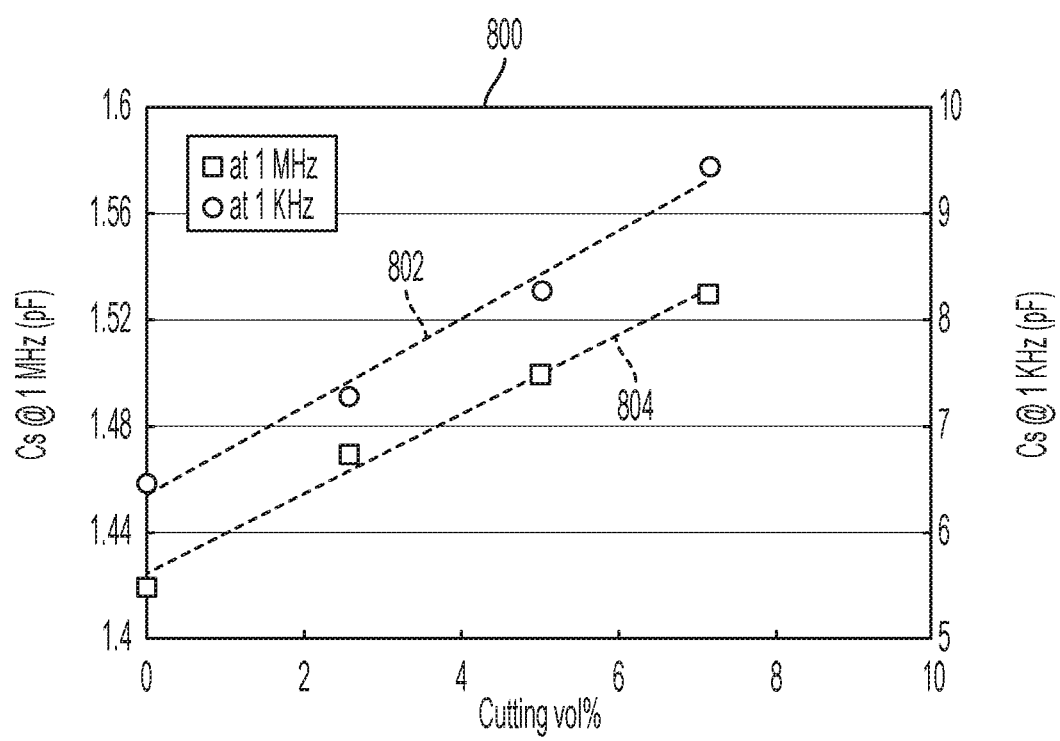

FIG. 8 is a graph of additional calibration curves for the sensor in FIG. 6 according to some aspects of the disclosure. Graph 800 shows the capacitance at 1 kHz and 1 MHz as a function of cutting concentration. Line 802 is a linear best fit function for the measured data at 1 kHz and line 804 is a linear best fit function for the measured data at 1 MHz. The dependence represented by the slope of these lines is valid for other frequencies.

Figure 9:
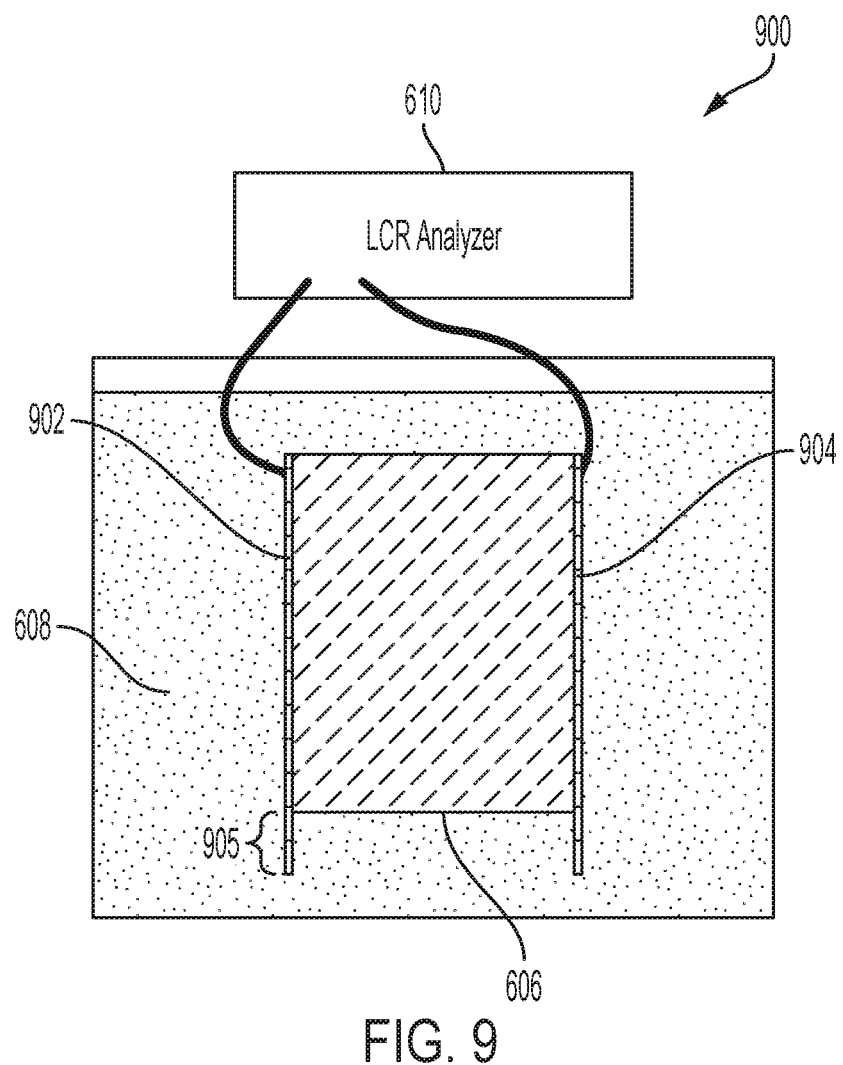
FIG. 9 is a cross-sectional view of another sensor that can be used in real-time monitoring of drill cuttings according to some aspects of the disclosure. The sensor in FIG. 9 is shown in a calibration setup according to some aspects of the disclosure.

FIG. 9 is a cross-sectional view of another sensor that can be used in real-time monitoring of drill cuttings according to some aspects of the disclosure. Sensor 900 includes, as electrodes, two parallel plates, 902 and 904, separated by the same insulating material 606. The pair of parallel plates 902 and 904 are longer by a small amount 905, for example one-quarter inch. The sensor 900 is again immersed in drilling fluid 608 of OBM at 12.7 ppg concentration and connected to impedance (LCR) analyzer 610 for calibration. Impedance is again measured over a frequency range of 1 kHz to 1 MHz.

Figure 10:
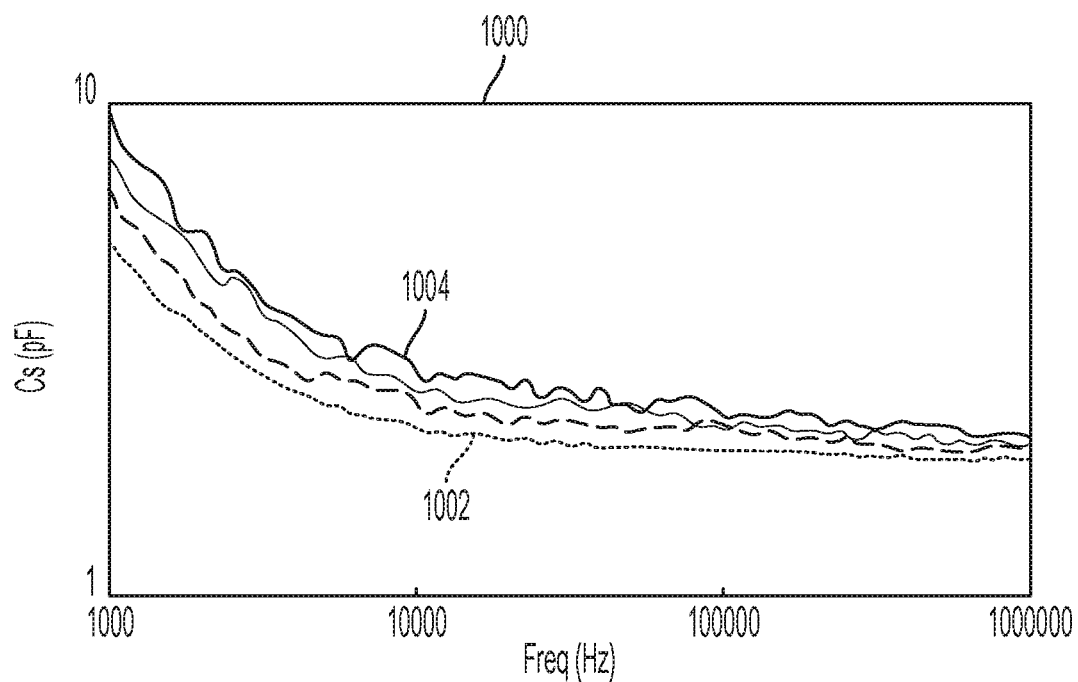
FIG. 10 through FIG. 13 are graphs of calibration curves for the sensor in FIG. 8 according to some aspects of the disclosure.

FIG. 10 is a graph of a calibration curve for the sensor in FIG. 9 according to some aspects of the disclosure. Graph 1000 of FIG. 10 shows capacitance as a function of frequency using the sensor 900 described above for the OBM with various cutting loadings. The capacitance profile shifts upward with increasing cutting concentration in the drilling fluid. The lowest line 1002 on the graph is the capacitance with no cuttings and the highest line on the graph 1004 is the capacitance with a volume percentage of 7.14 percent by volume of cuttings. The other lines represent intermediate percent-by-volume cutting concentrations of 2.50 and 4.88 percent by volume moving from the lowest capacitance towards the highest. This sensor can detect a small change of cutting concentration in the drilling fluid. A correlation between the capacitance and cutting concentration (in volume fraction) can be obtained at any fixed frequency in the calibrated range.

Figure 11:
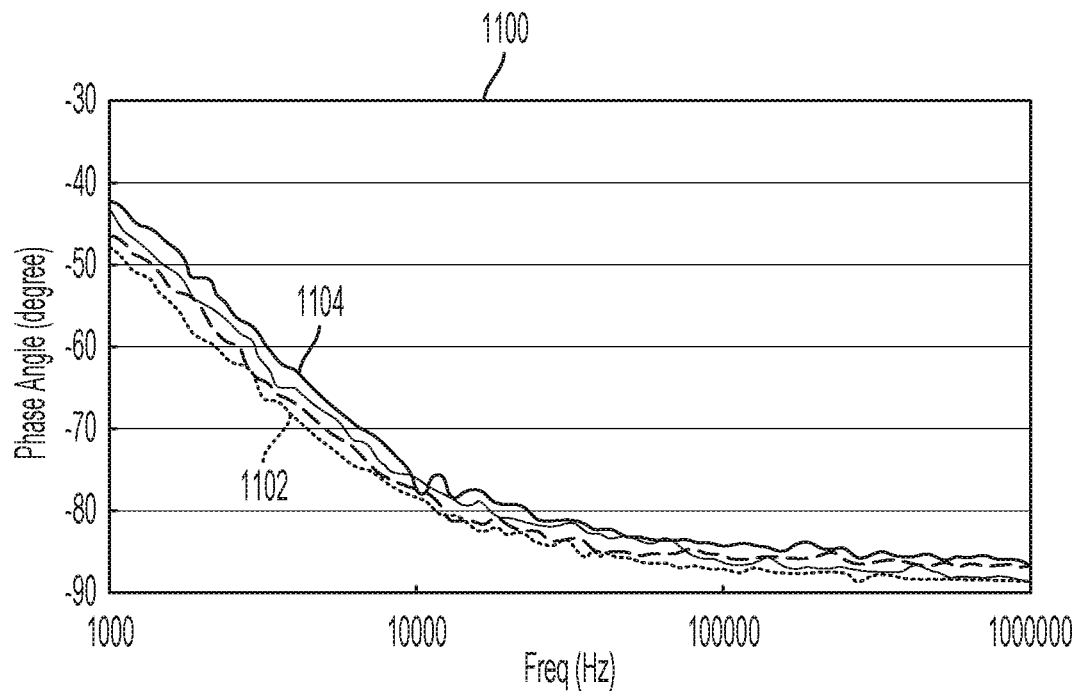

FIG. 11 is a graph of another calibration curve for the sensor in FIG. 9 according to some aspects of the disclosure. FIG. 11 shows a phase angle profile for sensor 900. Graph 1100 shows phase angle as a function of frequency using the sensor 900 described above for the OBM with various cutting loadings. The phase angle profile shifts upward with increasing the cutting concentration in the drilling fluid. The lowest line 1102 on the graph is the phase angle with no cuttings and the highest line on the graph 1104 is the phase angle with a volume percentage of 7.14 percent by volume of cuttings. The other lines represent intermediate percent-by-volume cutting concentrations of 2.50 and 4.88 percent by volume moving up from the largest negative phase towards the smallest negative phase.

Figure 12:
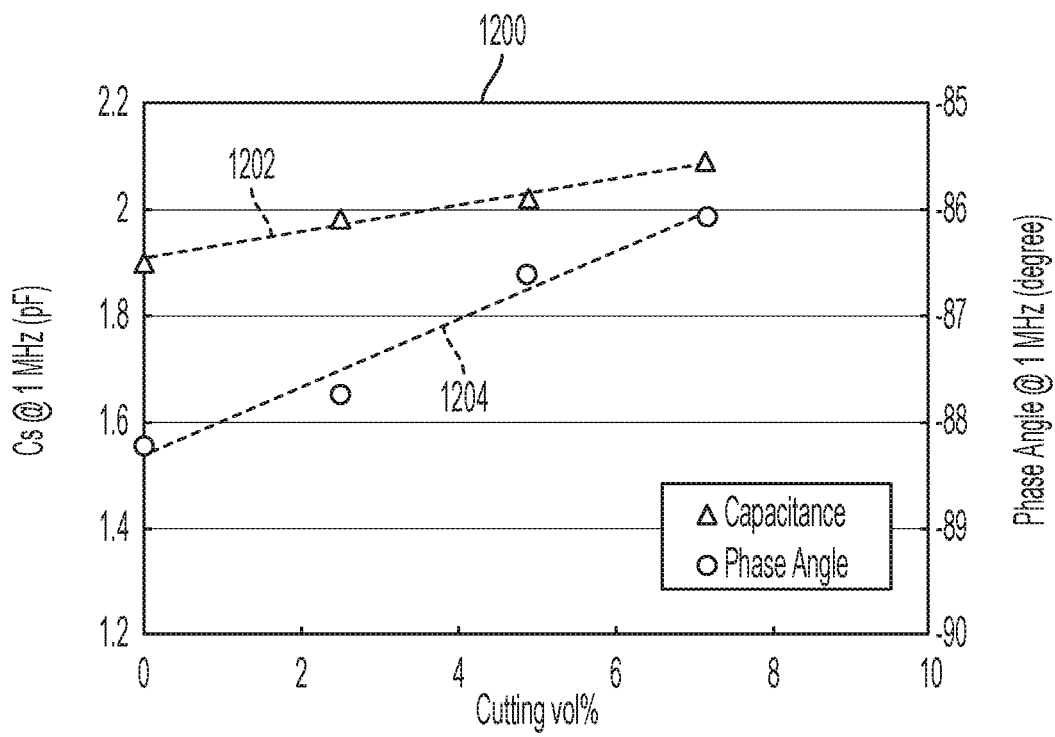

FIG. 12 is a graph of another calibration curve for the sensor in FIG. 9 according to some aspects of the disclosure. Graph 1200 shows the capacitance and the phase angle at 1 MHz as a function of cutting concentration. Line 1202 is a linear best fit function for the measured capacitance data and line 1204 is a linear best fit function for the measured phase data. The dependence represented by the slope of these lines is valid for other frequencies.

Figure 13:
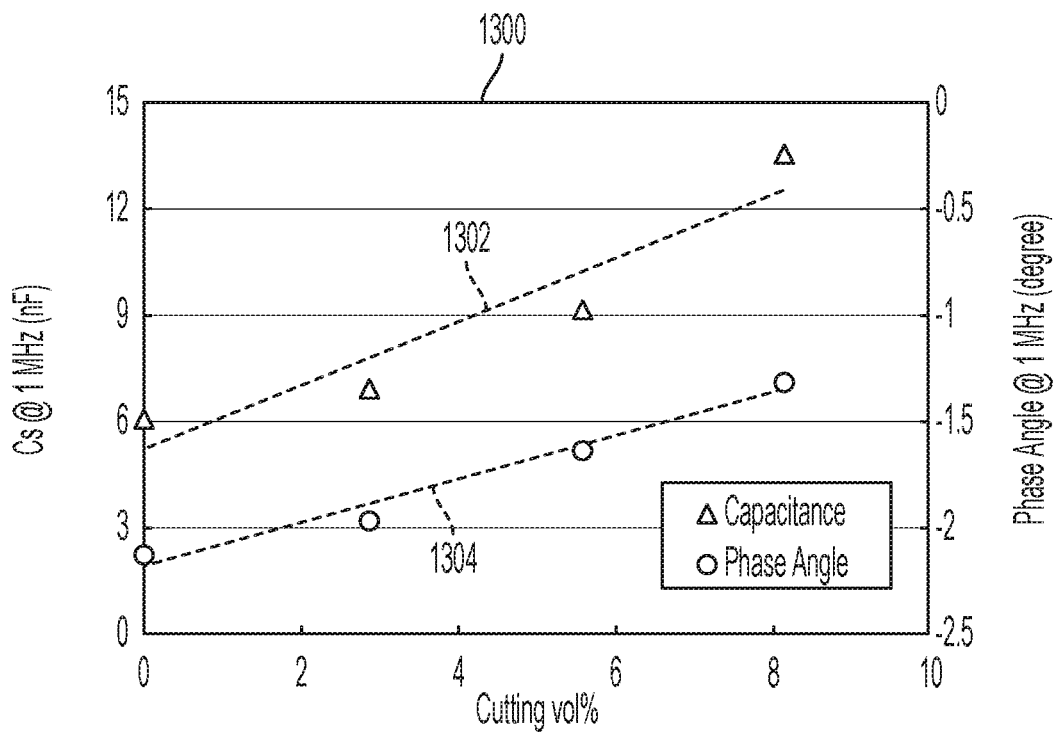

FIG. 13 is a graph of another calibration curve for the sensor in FIG. 6 according to some aspects of the disclosure. In the case of FIG. 13, the date is for water-based mud (WBM) at a concentration of 18 ppg. Graph 1300 shows the capacitance and the phase angle at 1 MHz as a function of cutting concentration. Line 1302 is a linear best fit function for the measured capacitance data at and line 1304 is a linear best fit function for the measured phase angle data. The dependence represented by the slope of these lines is valid for other frequencies.

Figure 14A:
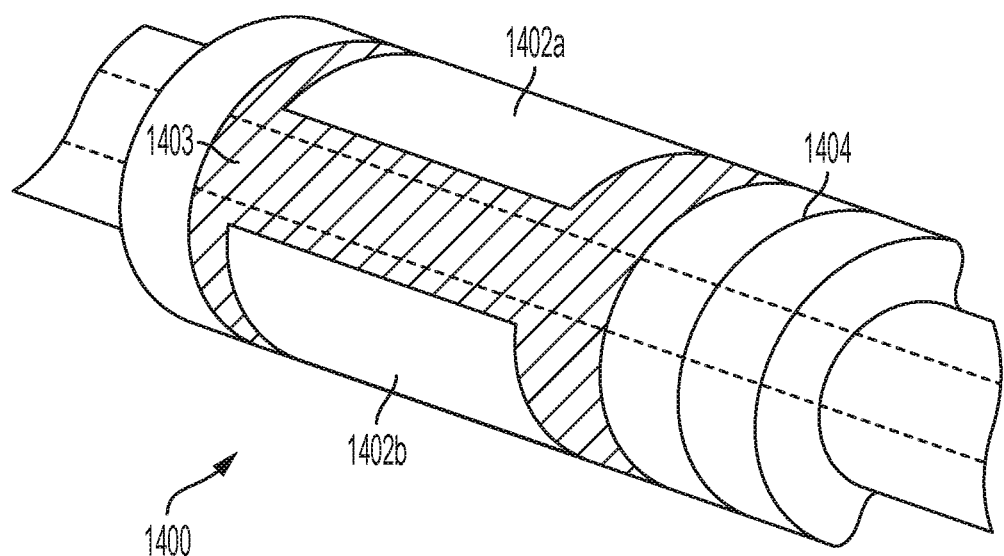
FIG. 14A and FIG. 14B are views of another tool joint including a sensor that can be used in real-time monitoring of drill cuttings according to some aspects of the disclosure.
Figure 14B:
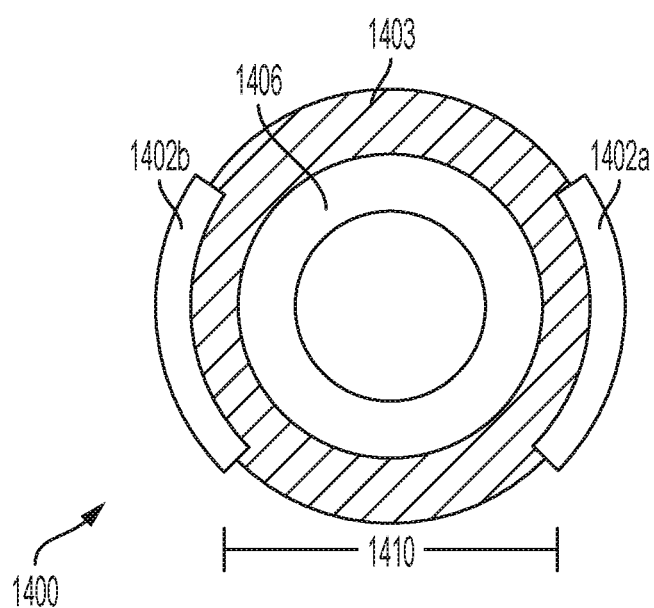

FIG. 14A and FIG. 14B are views of another tool joint including sensor that can be used in real-time monitoring of drill cuttings according to some aspects of the disclosure. Tool joint 1400 of FIG. 14 includes a sensor with two electrodes 1402a and 1402b, which take the form of curved plates. Insulating material 1403 supports electrodes 1402a and 1402b. A seam 1404 results from internal threads that allow the tool joint to be separated as needed. Tool joint 1400 includes and internal pipe 1406. Insulating material not only insulates the electrodes from each other and the tool joint, but also maintains a consistent separation distance 1410 between the electrodes.

Figure 15A:
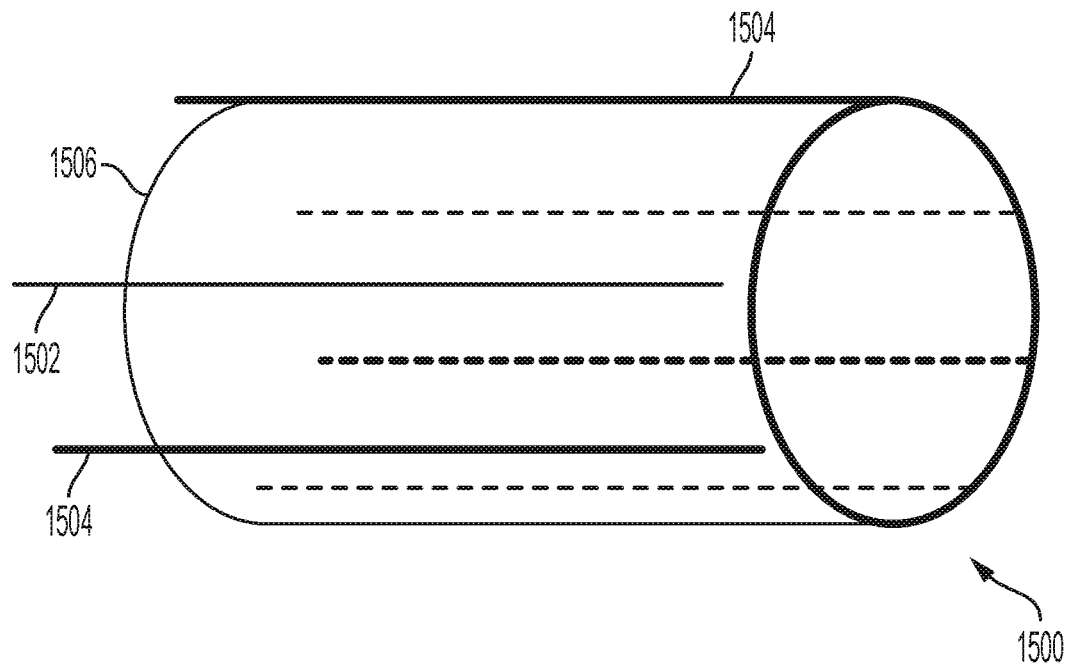
FIG. 15A and FIG. 15B are views of an additional sensor that can be used in real-time monitoring of drill cuttings according to some aspects of the disclosure.
Figure 15B:
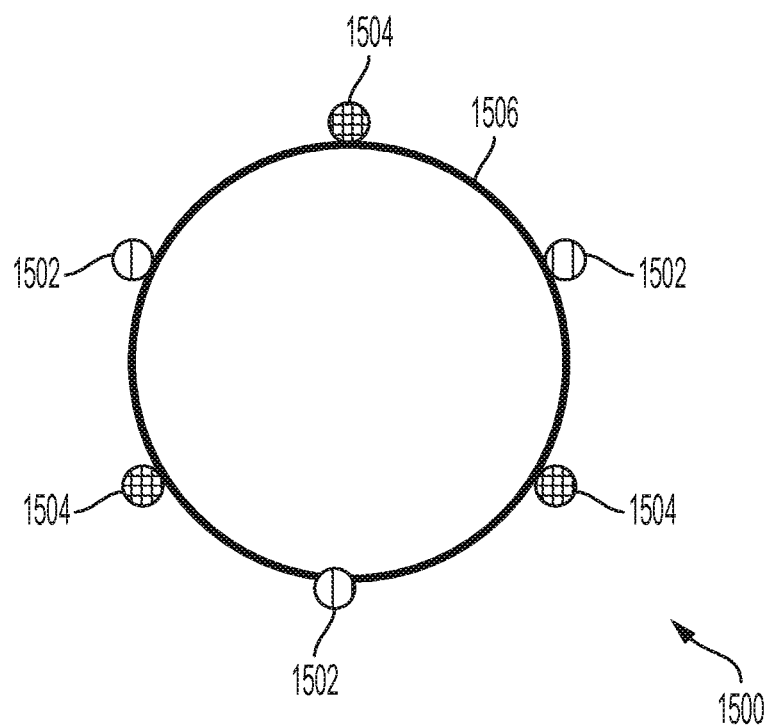

FIG. 15A and FIG. 15B are views of another sensor that can be used in real-time monitoring of drill cuttings according to some aspects of the disclosure. Sensor 1500 of FIG. 15 includes six electrodes, three electrodes 1502 and three electrodes 1504, evenly spaced around the circumference of a drill pipe 1506. The electrodes substantially parallel to the axis of the drill pipe. With a sensor such as sensor 1500, multiple electrodes can be used to enhance the impedance signal. It is also possible to obtain the cutting concentration distribution across the annulus by alternately connecting the electrodes. Electrodes 1502 form pairs with electrodes 1504 in order to provide three pairs of electrodes. The impedance signal from each pair of electrodes can provide a local cutting concentration from a correlation developed in a calibration process to produce calibration curves similar to those previously discussed. A cutting concentration mapping of the annulus can then be created. The cutting concentration of the annulus can be especially useful in understanding conditions in horizontal and inclined drillings. If a short in an electrode is detected based on an outlying signal from one pair of electrodes, those electrodes and the data in the associated portion of the annulus can be programmatically removed from the mapping. The short can also be reported, for example, via display to on operator. A sensor can use electrodes of various geometries. For example, a sensor could include two or more pairs of parallel plates instead of multiple pairs of rods. Electrodes that are not parallel can also be used.

It cannot be overemphasized that a wide variety of electrode geometries and numbers of electrodes can be used for monitoring cutting concentration as described. All that is required is that the sensor based on any electrode configuration be calibrated to produce appropriate calibration curves. The curve data can then be used to create impedance look-up tables as discussed with respect to computer program instructions 410 of FIG. 4.

Terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above," "below," "less," and "greater" are intended to encompass the concept of equality, thus, "less" can mean not only "less" in the strictest mathematical sense, but also, "less than or equal to."

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected," "connectable," or with similar terms can be connected directly or through intervening elements.

In some aspects, a system for monitoring drill cuttings is provided according to one or more of the following examples. As used below, any reference to a series of examples is to be understood as a reference to each of those examples disjunctively (e.g., "Examples 1-4" is to be understood as "Examples 1, 2, 3, or 4").

Example 1. A system includes a sensor, a processing device communicatively coupled to the sensor, and a non-transitory memory device further including instructions that are executable by the processing device to cause the processing device to perform operations. The operations include applying a transmitted signal to the sensor, receiving an impedance signal from the sensor in response to the transmitted signal, and correlating the impedance signal with a wellbore cuttings concentration at the sensor; and outputting the wellbore cuttings concentration.

Example 2. The system of example 1 wherein the sensor further includes a plurality of electrodes attachable to a drill string.

Example 3. The system of example(s) 1-2 wherein the plurality of electrodes is attachable to the drill string at or near an along-string-measurement (ASM) tool joint.

Example 4. The system of example(s) 1-3 wherein the operations further include detecting a shorted electrode from among the electrodes, and preventing the shorted electrode from contributing to the impedance signal.

Example 5. The system of example(s) 1-4 wherein correlating the impedance signal with the wellbore cuttings concentration includes correlating at least one of capacitance or phase angle with the wellbore cuttings concentration.

Example 6. The system of example(s) 1-5 wherein the transmitted signal includes a frequency from 1 kHz to 1 GHz.

Example 7. The system of example(s) 1-6 wherein the operations further include comparing the wellbore cuttings concentration to an expected cuttings concentration, wherein the expected cuttings concentration is based on a stored model.

Example 8. A sensor including multiple electrodes attachable to a drill string to be in proximity to wellbore cuttings, the sensor also connectable to a processing device uphole to send an impedance signal uphole to the processing device in response to a transmitted signal from the processing device.

Example 9. The sensor of example 8 wherein the electrodes include a pair of parallel plates.

Example 10. The sensor of example(s) 8-9 wherein the electrodes include at least two pairs of parallel plates.

Example 11. The sensor of example(s) 8-10 wherein the electrodes include multiple parallel rods spaced around a circumference of a drill pipe, each of the parallel rods also substantially parallel to an axis of the drill pipe.

Example 12. The sensor of example(s) 8-11 wherein the electrodes include at least one of circular electrodes or curved plates attachable to an along-string-measurement (ASM) tool joint.

Example 13. The sensor of example(s) 8-12 further including the ASM tool joint.

Example 14. A method includes applying, by a processing device, a transmitted signal to a sensor located in a well along a drill string, receiving, by the processing device, an impedance signal from the sensor in response to the transmitted signal, correlating, by the processing device, the impedance signal with a wellbore cuttings concentration at the sensor, and outputting, by the processing device, the wellbore cuttings concentration.

Example 15. The method of example 14 wherein the sensor includes multiple electrodes attachable to a drill string.

Example 16. The method of example(s) 14-15 wherein the electrodes are attachable to the drill string at or near an along-string-measurement (ASM) tool joint.

Example 17. The method of example(s) 14-16 further including detecting a shorted electrode from among the electrodes, and preventing the shorted electrode from contributing to the impedance signal.

Example 18. The method of example(s) 14-17 wherein correlating the impedance signal with the wellbore cuttings concentration includes correlating at least one of capacitance or phase angle with the wellbore cuttings concentration.

Example 19. The method of example(s) 14-18 wherein the transmitted signal includes a frequency from 1 kHz to 1 GHz.

Example 20. The method of example(s) 14-19 further including comparing the wellbore cuttings concentration to an expected cuttings concentration, wherein the expected cuttings concentration is based on a stored model.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
   a sensor;
   a processing device communicatively coupled to the sensor; and
   a non-transitory memory device comprising instructions that are executable by the processing device to cause the processing device to perform operations comprising:
      applying a transmitted signal to the sensor;
      receiving an impedance signal from the sensor in response to the transmitted signal;
      correlating, using a calibration curve, the impedance signal with a wellbore cuttings concentration at the sensor, the calibration curve indicating the wellbore cuttings concentration with respect to capacitance and frequency; and
      outputting the wellbore cuttings concentration.

2. The system of claim 1 wherein the sensor further comprises a plurality of electrodes attachable to a drill string.

3. The system of claim 2 wherein the plurality of electrodes is attachable to the drill string at or near an along-string-measurement (ASM) tool joint.

4. The system of claim 2 wherein the operations further comprise:
   detecting a shorted electrode from among the plurality of electrodes; and
   preventing the shorted electrode from contributing to the impedance signal.

5. The system of claim 1 wherein correlating, using the calibration curve, the impedance signal with the wellbore cuttings concentration includes correlating at least one of capacitance or phase angle with the wellbore cuttings concentration, and wherein the transmitted signal comprises a frequency of 1 kHz to 1 GHz.

6. The system of claim 1 wherein the operations further comprise comparing the wellbore cuttings concentration to an expected cuttings concentration, wherein the expected cuttings concentration is based on a stored model.

7. The system of claim 1, wherein the calibration curve is obtainable by measuring, using an impedance analyzer and the sensor, a plurality of capacitance values for a drilling fluid over a range of frequencies and a range of cuttings concentrations.

8. A sensor comprising a plurality of electrodes attachable to a drill string to be in proximity to wellbore cuttings, the sensor connectable to a processing device uphole to send an impedance signal uphole to the processing device in response to a transmitted signal from the processing device, the processing device configured to correlate, using a calibration curve, the impedance signal with a wellbore cuttings concentration at the sensor, the calibration curve indicating the wellbore cuttings concentration with respect to capacitance and frequency.

9. The sensor of claim 8 wherein the plurality of electrodes comprises a pair of parallel plates.

10. The sensor of claim 8 wherein the plurality of electrodes comprises at least two pairs of parallel plates.

11. The sensor of claim 8 wherein the plurality of electrodes comprises a plurality of parallel rods spaced around a circumference of a drill pipe, each of the plurality of parallel rods also substantially parallel to an axis of the drill pipe.

12. The sensor of claim 8 wherein the plurality of electrodes comprises at least one of circular electrodes or curved plates attachable to an along-string-measurement (ASM) tool joint.

13. The sensor of claim 12 further comprising the ASM tool joint.

14. A method comprising:
   applying, by a processing device, a transmitted signal to a sensor located in a well along a drill string;
   receiving, by the processing device, an impedance signal from the sensor in response to the transmitted signal;
   correlating, by the processing device and using a calibration curve, the impedance signal with a wellbore cuttings concentration at the sensor, the calibration curve indicating the wellbore cuttings concentration with respect to capacitance and frequency; and
   outputting, by the processing device, the wellbore cuttings concentration.

15. The method of claim 14 wherein the sensor comprises a plurality of electrodes attachable to a drill string.

16. The method of claim 15 wherein the plurality of electrodes is attachable to the drill string at or near an along-string-measurement (ASM) tool joint.

17. The method of claim 15 further comprising:
   detecting a shorted electrode from among the plurality of electrodes; and
   preventing the shorted electrode from contributing to the impedance signal.

18. The method of claim 14 wherein correlating the impedance signal with the wellbore cuttings concentration comprises correlating at least one of capacitance or phase angle with the wellbore cuttings concentration.

19. The method of claim 18 wherein the transmitted signal comprises a frequency from 1 kHz to 1 GHz.

20. The method of claim 14 further comprising comparing the wellbore cuttings concentration to an expected cuttings concentration, wherein the expected cuttings concentration is based on a stored model.

* * * * *